United States Patent [19]

Sandrock

[11] 4,161,401

[45] Jul. 17, 1979

[54] NICKEL-CALCIUM ALLOY FOR HYDROGEN STORAGE

[75] Inventor: Gary D. Sandrock, Ringwood, N.J.

[73] Assignee: The International Nickel Company, Inc., New York, N.Y.

[21] Appl. No.: 847,797

[22] Filed: Nov. 2, 1977

Related U.S. Application Data

[62] Division of Ser. No. 739,481, Nov. 8, 1976, Pat. No. 4,096,641.

[51] Int. Cl.$^2$ .............................................. C22C 19/03
[52] U.S. Cl. ................................... 75/170; 75/134 C; 423/644
[58] Field of Search .............. 75/170, 134 C; 423/644; 34/15

[56] References Cited

U.S. PATENT DOCUMENTS 3,967,465  7/1976  Asselman et al. ...................... 75/170

FOREIGN PATENT DOCUMENTS 1320093  6/1973  United Kingdom ..................... 75/170

Primary Examiner—R. Dean
Attorney, Agent, or Firm—Ewan C. MacQueen; Walter A. Petersen; Miriam W. Leff

[57] ABSTRACT

A calcium-nickel compound, $CaNi_5$, is used to store hydrogen at sub-atmospheric pressures. Charging of the calcium-nickel compound with hydrogen can be accomplished at sub-atmospheric as well as at high pressures. Stored hydrogen can be released from a valved vessel containing calcium-nickel by application of a vacuum or by heating.

1 Claim, No Drawings

NICKEL-CALCIUM ALLOY FOR HYDROGEN STORAGE

This is a division of application Ser. No. 739,481, filed Nov. 8, 1976, U.S. Pat. No. 4,096,641.

The present invention is directed to a method for the storage of hydrogen at sub-atmospheric pressures.

The use of hydrogen gas as a fuel has received considerable attention during recent years because hydrogen can be generated by a variety of methods that do not rely on fossil fuels, (e.g., solar energy, nuclear energy, and water power). One of the principal problems confronting wide acceptance of hydrogen as a fuel is related to storage. At present, hydrogen is commonly stored under relatively high pressure, e.g., 136 atmospheres, in steel storage cylinders. This type of storage is adequate for many applications; however, due to weight and bulk requirements, such high-pressure cylinders cannot be readily adapted to the requirements of operational units such as vehicles. Furthermore, in many instances, the required high pressures are considered unsafe.

In order to circumvent the problems attending conventionally used storage methods, considerable attention has been directed recently to the storage of hydrogen as a hydride. Compounds of the type $AB_5$ and commonly referred to as a $CaCu_5$ type of structure have received considerable attention. The compounds have a hexagonal crystal structure and are capable of absorbing hydrogen to a volume density of almost twice that of liquid hydrogen, roughly $6\times10^{22}$ atoms/cm$^3$.

Although many of these compounds are capable of being used for the storage of hydrogen, the hydrogen must be introduced to the compound at comparatively high pressures, and a relatively high pressure must be maintained within the containing apparatus in order to prevent decomposition of hydride. Thus, although the problem attendant to the storage of hydrogen at high pressures can be overcome to some extent by storage in presently known hydridable compounds, the problem has not been entirely overcome since pressures considerably above atmospheric are required. H. H. Van Mal, K. H. J. Buschow, and A. R. Miedema have reported in the Journal of the Less-Common Metals, Vol. 35, (1974), that a pressure of 15 atmospheres is required for the storage of hydrogen in $CaNi_5$ at room temperature.

It has now been discovered that the compound $CaNi_5$ can be charged with hydrogen at sub-atmospheric pressures as well as at high pressures and that hydrogen can be desorbed therefrom at sub-atmospheric pressures at ambient temperature.

Generally speaking, the present invention is an improved method for hydrogen storage, the improvement comprising, storing hydrogen in a $CaNi_5$ compound at a hydrogen partial pressure below about one atmosphere absolute.

The discovery that the $CaNi_5$ compound is surprisingly capable of storing hydrogen at pressures below one atmosphere, rather than at pressures above 15 atmospheres as previously known, affords an opportunity to collect and store gaseous hydrogen under conditions that are considerably safer than any previously known. The apparatus of this invention provides a comparatively stable, low-pressure system for hydrogen storage that is not subject to hydrogen pressurization at ambient or lower temperatures. Hydrogen can be easily removed from the apparatus by a number of simple expedients including increasing the temperature of the containing vessel and use of a vacuum pump.

The apparatus can be charged with hydrogen at pressures slightly below, equal to, or higher than atmospheric. Hydrogen will not be released from the apparatus at ambient temperatures when the external pressure of the container is returned to atmospheric but requires subatmospheric pressures to be reached, on the order of about 0.4 to about 0.6 atmosphere. Thus, the apparatus is advantageously capable of absorbing hydrogen from a number of low pressure sources. An example of such a low pressure source is the hydrogen generated from the electrolysis of water. Similarly, the hydrogen used in a hydrogen atmosphere furnace and presently burned after serving as the furnace atmosphere can be recovered using the apparatus of this invention. Also, the apparatus can be used to selectively absorb hydrogen from a pressurized mixture of gases such as a mixture of carbon monoxide, hydrogen, carbon dioxide, etc. The calcium-nickel compound is substantially resistant to contamination by oxygen during service and thus is advantageously used in gas mixtures.

Since high pressures are not required to store the hydrogen, nor required to evolve hydrogen from the apparatus, it is possible, although not essential, to use storage container materials other than those now commonly used for the storage of pressurized gases. Thus, rather than the conventional thick-walled, low-alloy steel vessel, other metallic materials such as lightweight aluminum alloys can be substituted to advantageously provide capabilities for non-conventional configurations that are not ordinarily obtainable.

The $CaNi_5$ compounds can be prepared by conventional melting techniques already known for the preparation of nickel-calcium alloys. The compound can be prepared by induction melting a nickel charge. Calcium, as metallic calcium or in the form of a suitable nickel, high-calcium master alloy, is introduced to the nickel melt. The melt is then conveniently poured into pig molds. Upon cooling to room temperature, the pigs are removed from their molds and subjected to a conventional crushing and screening operation to provide particulate nickel-calcium granules of appropriate size, (e.g., −4 mesh U.S. Standard Sieve Size).

The nickel-calcium should be melted with a tolerance of about plus or minus 15% on the two ingredients. Thus, the compound should have the formula $Ca_{0.85-1.15}Ni_{5.15-4.85}$. Since metallic compounds are generally prepared on a weight basis rather than an atomic basis, the charge on a weight basis would consist of about 88% nickel and 12% calcium. The required tolerance on melting range on a weight basis lends an alloy containing from about 10% to about 14% calcium with the balance essentially nickel.

As will be understood by those skilled in the art, the use of the expression "balance essentially" does not exclude the presence of other elements commonly present as incidental elements, e.g., the deoxidizing and cleansing aid elements, and impurities normally associated therewith in small amounts which do not adversely affect the novel characteristics of the alloys.

For the purpose of giving those skilled in the art a better understanding of the invention, the following illustrative examples are given:

EXAMPLE I

An 8-kilogram heat of a nickel, 12 weight percent calcium alloy was prepared by melting a charge of electrolytic nickel in an induction furnace having a clay-graphite crucible (such as a No. 30 crucible sold under the Trademark DIXAGRAF and available from Joseph Dixon Crucible Company). The nickel was heated to about 1475° C. and pieces of metallic calcium wired to nickel rods were plunged beneath the surface of the melt. The molten alloy was poured into 4" diameter, tapered, cast-iron molds and allowed to cool to room temperature. The nickel, 12% calcium alloy was readily crushed to granular form and sieved to separate coarse from fine fractions.

Eight grams of −10 mesh, +14 mesh granules of the nickel, 12% calcium alloy were placed in a 15 mm diameter by 35 mm high reactor vessel. A vacuum pump was used to remove air from this chamber to achieve a vacuum of about $10^{-2}$ Torr. The vacuum source was valved off and ultra high purity hydrogen introduced to the apparatus. For experimental purposes, a hydrogen pressure of 68 atmospheres was used to pressurize the apparatus. It was observed that the specimen began to activate immediately and absorbed large quantities of hydrogen.

Table I

Hydrogen Desorption Characteristics of $CaNi_5$ at 25° C.

| H/M Ratio | Dissociation Pressure, Atmospheres |
|---|---|
| 1.06 | 68.0 |
| 1.0 | 25.0 |
| 0.9 | 18.0 |
| 0.8 | 2.2 |
| 0.6 | 0.51 |
| 0.4 | 0.48 |
| 0.2 | 0.42 |
| 0.15 | 0.14 |

Table II

Relationship between Dissociation Pressure (at H/M=0.5) and Temperature for $CaNi_5$

| Temp., °C. | Dissociation Pressure, Atmospheres |
|---|---|
| 25 | 0.5 |
| 40 | 0.9 |
| 60 | 1.9 |
| 80 | 3.6 |

Within a time period of about 15 minutes, the specimen was essentially saturated. (Note that the alloy can also be activated at pressures as low as 1 atmosphere.)

After charging at 68 atmospheres and discharging to atmospheric pressure, the 8 grams of alloy contained 0.11 g of hydrogen and was stable in a hydrogen atmosphere.

Hydrogen desorption pressures were measured at 25° C. as a function of H/M ratio (atomic ratio of the number of hydrogen atoms to the number of metal atoms) and a plateau was found at a pressure of about 0.5 atmosphere. Table I shows this relationship.

Similar measurements were made at temperatures of 40°, 60°, and 80° C.; and as shown in Table II, hydrogen was provided at pressures significantly above ambient at 60° and 80° C. Thus, pressurized hydrogen can be released from the apparatus of this invention by the simple expedient of increasing the temperature of the calcium-nickel compound.

The alloy was advantageously found to have a low hysteresis, (i.e., the difference between the hydrogen pressures needed for absorption and desorption). For example, at 25° C. the hysteresis is on the order of 0.05 to 0.1 atmosphere.

In those applications where it is desireable to provide an alloy having the capability for storing hydrogen advantageously at pressures below the level of about 0.4 to about 0.6 atmosphere, and specifically at levels below about 0.2, copper can be substituted in part for nickel. To illustrate, an alloy having the approximate formula $Ni_4 Cu Ca_{0.9}$ was found to provide hydrogen desorption pressures, at 25° C., for H/M ratio between 0.2 and 0.6 of between 0.1 atmosphere and 0.2 atmosphere. The alloy which was prepared in the manner described hereinbefore contained, in weight percent, 70.4% Ni, 18.5% Cu, 10.6% Ca, 0.020% O, 0.072% N and 0.009% C. In general, nickel-copper-calcium alloys according to this invention can contain, in weight percent, from about 5% to about 40% copper, from about 10% to about 14% calcium, and the balance essentially nickel. Preferably, such alloys contain, in weight percent, from about 15% to about 25% copper, from about 10% to about 14% calcium, and the balance essentially nickel.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An alloy for the storage of hydrogen at subatmospheric pressures consisting essentially of, in weight percent, about 18.5% Cu, about 10.6% Ca, and the balance essentially nickel.

* * * * *